United States Patent [19]

Woo

[11] 4,336,867
[45] Jun. 29, 1982

[54] DRUM BRAKE HAVING DUO MODE
[75] Inventor: Ji Y. Woo, South Bend, Ind.
[73] Assignee: The Bendix Corporation, Southfield, Mich.
[21] Appl. No.: 80,809
[22] Filed: Oct. 1, 1979
[51] Int. Cl.³ .................... F16D 51/20; F16D 51/50
[52] U.S. Cl. .......................... 188/326; 188/79.5 P; 188/332; 188/106 A; 188/106 F
[58] Field of Search .......... 188/79.5 P, 106 A, 106 F, 188/325, 326, 327, 328, 329, 330, 331, 332

[56] References Cited
U.S. PATENT DOCUMENTS 2,295,758  9/1942  Safford ........................ 188/106 A
3,708,044  1/1973  Torri et al. ..................... 188/326
3,977,500  8/1976  Farr ............................ 188/106 A

FOREIGN PATENT DOCUMENTS 691362   7/1965  Italy ............................ 188/326
1191115  5/1970  United Kingdom ........... 188/79.5 P Primary Examiner—Edward R. Kazenske
Attorney, Agent, or Firm—Paul David Schoenle; Ken C. Decker

[57] ABSTRACT

A drum brake assembly includes a pair of brake shoes which are carried by a backing plate and engageable with a hydraulic actuator. The hydraulic actuator is operable to move the pair of brake shoes from a rest position to a braking position. A strut extending between the pair of brake shoes cooperates with a parking arm to move the pair of brake shoes to the braking position during a parking brake application. A support assembly on the backing plate is disposed opposite the hydraulic actuator for the purpose of absorbing braking torque developed by the pair of brake shoes. The support assembly comprises a pair of slots and a lever. The lever is movable in response to movement of the parking arm to adjust the position of the pair of blocks relative to each other. In a first position the blocks are in abutment with the backing plate while in a second position the blocks are free to move a limited amount relative to the backing plate. Moreover, the lever imparts a separating force to the pair of brake shoes via the blocks during a parking brake application to expand the brake shoes radially. This expansion is in addition to the movement imparted to the brake shoes by the strut and parking arm.

5 Claims, 4 Drawing Figures

DRUM BRAKE HAVING DUO MODE

BACKGROUND OF THE INVENTION

A non-servo drum brake provides a support assembly on a backing plate to pivotally anchor a pair of brake shoes. A hydraulic actuator is engageable with the pair of brake shoes to pivot the brake shoes about the support assembly from a rest position to a braking position. An adjustable strut extends between the pair of brake shoes to compensate for lining wear and a parking arm cooperates with the strut to move the pair of brake shoes to the braking position during a parking brake application.

The non-servo drum brake is frequently used as a rear brake on vehicles with front wheel disc brakes. The non-servo rear drum brake is sufficient to assist the front wheel disc brakes in stopping the vehicle. It is designed to develop less torque than the disc brake to reduce the chance of wheel skidding. A problem exists during a parking brake mode because the rear non-servo drum brake is required to hold the vehicle stationary without any assistance from the front wheel disc brake. One solution to this problem is to free the support assembly during a parking brake mode as taught by U.S. patent application Ser. No. 12,991, filed on Feb. 21, 1979. Such an arrangement converts the non-servo drum brake to a Duo-Servo (trademark) drum brake only during a parking brake application.

SUMMARY OF THE INVENTION

The present invention covers an improvement in a non-servo drum brake wherein a support assembly or anchor bracket is altered to expand a pair of brake shoes during a parking brake application.

In particular a drum brake includes a backing plate which carries a hydraulic actuator and a support assembly opposite the hydraulic actuator. The backing plate also movably carries a pair of brake shoes engageable with the hydraulic actuator and the support assembly. An adjustable strut extends between the brake shoes adjacent the hydraulic actuator to define a rest position for the brake shoes. The adjustable strut also cooperates with a pawl mounted on one of the brake shoes to take up lining wear for the brake shoes. A parking arm mounted on either brake shoe cooperates with the adjustable strut to move the brake shoes to a braking position engaging a rotatable member during a parking brake application.

The support assembly comprises a pair of pins fixedly secured to the backing plate and loosely carrying a pair of blocks within a cage attached to the backing plate by the pins. Each block is engageable with a respective brake shoe and a retraction spring extending between the shoes biases the shoes and blocks to a rest position in abutment with the pins. A lever is pivotally carried within the cage between the blocks. The lever extends outwardly of the cage and connects with a connector and a link attached to the parking arm. The link is coupled to a parking brake cable which is movable by a vehicle operator to actuate a parking brake application.

When a parking brake application is initiated, the cable is pulled to pivot the link relative to the lever which causes the parking arm to pivot relative to the brake shoes and cooperates with the strut to move the brake shoes to the braking position. Thereafter, further movement of the cable pivots the link about the parking arm to actuate the lever within the cage. Cam surfaces on the lever facing the blocks move the latter away from each other in response to pivotal movement of the lever. As the blocks separate from each other, the pair of brake shoes are expanded to further engage the rotatable member.

When the parking brake application is terminated, a pair of retraction springs adjacent the hydraulic actuator and the support assembly withdraw the pair of brake shoes to the rest position.

It is an object of the present invention to provide a drum brake wherein a pair of brake sheos are movable by a hydraulic actuator to a braking position during a service brake application so that the pair of brake shoes pivot about a support assembly and to expand the pair of brake shoes during a parking brake application by means of a strut and parking arm and also by providing the support assembly with extendible blocks responsive to actuation of the parking arm.

DETAILED DESCRIPTION

Figure 1:
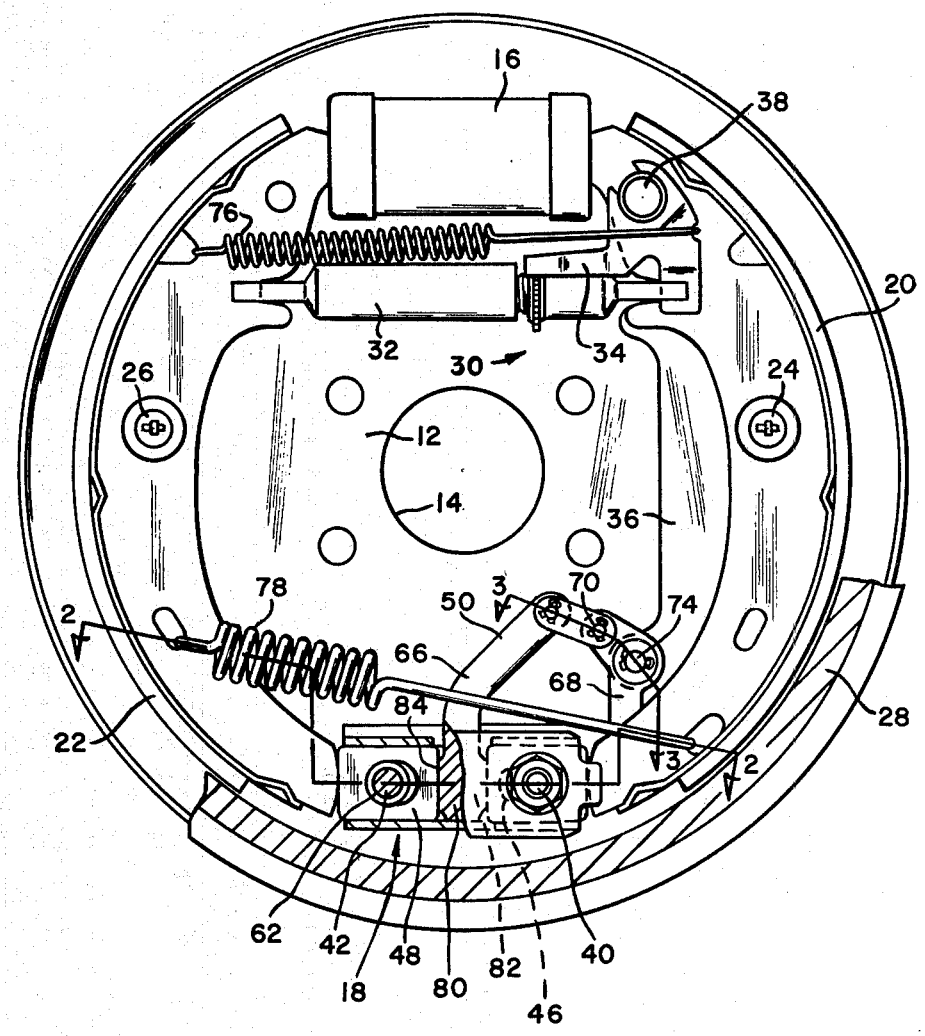
FIG. 1 is a front view of a drum brake assembly with a partial cutaway of a support assembly according to the present invention.
Figure 2:
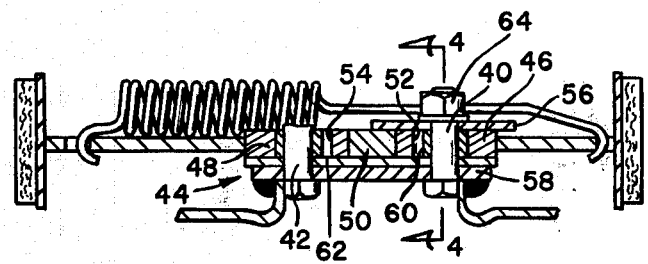
FIG. 2 is a cross-sectional view taken along line 2—2 of FIG. 1.
Figure 3:
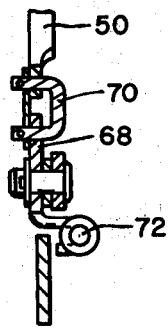
FIG. 3 is a cross-sectional view taken along line 3—3 of FIG. 1.
Figure 4:
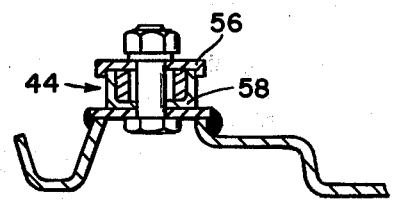
FIG. 4 is a cross-sectional view taken along line 4—4 of FIG. 2.

In FIG. 1, a drum brake assembly 10 includes a backing plate 12 with an opening 14 for receiving an axle shaft (not shown). The backing plate 12 supports a hydraulic actuator or wheel cylinder 16 at the top of the backing plate and a support assembly or anchor device 18 is carried at the bottom of the backing plate opposite the hydraulic actuator. A pair of brake shoes 20 and 22 are movably mounted on the backing plate via holddown springs 24 and 26. The brake shoes engage the hydraulic actuator and the support assembly so that actuation of the hydraulic actuator during a service brake application causes the brake shoes to move outwardly into engagement with a drum 28 by pivoting on the support assembly 18.

An adjuster device 30 includes an extendible strut 32 and a pawl 34. The pawl cooperates with the strut to extend the latter when the clearance between the brake shoes and rotor is greater than desired. A parking arm 36 is pivotally supported on the brake shoes 20 via pin 38 and is engageable with the strut 32. During a parking brake application the arm 36 is pivoted clockwise in FIG. 1 to push the strut 32 and shoe 22 to the left while the shoe 20 and pin 38 are moved to the right until the shoes engage the drum 28.

In accordance with the invention the support assembly 18 includes a pair of pins 40 and 42 extending outwardly from the backing plate 12 to carry a cage 44 with a pair of blocks 46 and 48 and a lever 50 disposed therein. Each block defines an eliptical opening 52 and 54 for receiving the respective pins 40 and 42. The cage 44 includes a top plate 56 and a U-shaped bottom cup 58. Spacers 60 and 62 fit over the pins and oppose the top plate and bottom cup so that when the plate is secured to the bottom cup via nuts 64 on the pins. The blocks are free to move a limited amount within the cage. Consequently, viewing FIG. 1, the blocks can move horizontally within the cage through a distance defined by the clearance between the eliptical openings and the spacers.

The lever 50 extends radially inwardly and is bent at 66 to tilt toward the parking arm 36. The parking arm 36 terminates in a link 68 opposite pin 38 and a connector 70 connects the end of lever 50 with one end of the link 68. The other end of the link 68 is coupled to a parking brake cable 72 which is movable by a vehicle operator during a parking brake application. A pin 74 pivotally connects the link 68 to the end of the parking arm 36 intermediate the connector 70 and cable 72.

A first retraction spring 76 adjacent the hydraulic actuator biases the brake shoes into engagement with the hydraulic actuator. A second retraction spring 78 extends between the pair of brake shoes adjacent the support assembly 18. The spring 78 biases the shoes into engagement with the blocks 46 and 48 and also biases the blocks to a rest position abutting pins 40 and 42, such that the left wall of opening 54 is engaging pin spacer 62 and the right wall of opening 52 is engaging pin spacer 60.

MODE OF OPERATION

During a service brake application, the hydraulic actuator moves the pair of brake shoes to pivot relative to the pins 46 and 48 until the shoes engage the drum 28. Torque developed during braking is transmitted to either pin 40 or 42, depending on the direction of rotation for the drum.

During a parking brake application, the cable 72 is pulled to the left in FIG. 1 so that link is biased to rotate clockwise about pin 74. The spring 78 acting through the shoes and blocks opposes pivoting of the lever 50 so that during initial parking brake application, the cable moves the link and parking arm to spread the shoes apart at the hydraulic actuator. The movement of the parking arm about pin 38 pushes the strut 32 and shoe 22 to the left while the pin 38 and shoe 20 are moved to the right in FIG. 1. Further pulling on the cable 72 after the shoes engage the drum near the hydraulic actuator causes the link 68 to rotate clockwise about pin 74 as the parking arm 36 is substantially stationary. The rotating link 68 acts through the connector 70 to pivot the lever 50 clockwise relative to the cage 44. A substantially rectangular base 80 on the lever is rotated so that cam surfaces 82 and 84 push against the respective blocks 46 and 48 to move the blocks and adjoining ends of the brake shoes outwardly. Consequently, the shoes are expanded further in response to movement of the parking arm 36 and lever 50 to increase the frictional engagement between the shoes and drum. Moreover, the blocks and base act as a rigid member connecting the shoes together, and the blocks are moved slightly away from the pins so that the pair of shoes respond in a duo-servo mode to movement of the drum.

It is evident from the foregoing description that many modifications and/or changes are feasible by one skilled in the art. For example, the lever 50 could be directly connected to the link 68 or to the parking arm 36 and means other than a pair of blocks 46 and 48 could be used to separate the shoes in response to actuation of the parking arm. As such, these and other modifications and/or changes are intended to be covered by the appended claims.

I claim:

1. In a drum brake assembly having a hydraulic actuator which cooperates with a pair of brake shoes to radially expand the latter from a rest position to a braking position during a service brake application, a backing plate for carrying the hydraulic actuator and the pair of brake shoes, a parking assembly cooperating with the pair of brake shoes to radially expand the latter from a rest position to a braking position during a parking brake application, said parking assembly including a strut extending between the pair of brake shoes substantially adjacent to said hydraulic actuator and said parking assembly also including an arm pivotal relative to one of the pair of brake shoes and engaged with said strut, and a support assembly engageable with said pair of brake shoes to absorb braking torque developed by said pair of brake shoes, said support assembly including a pair of blocks engageable, respectively, with said pair of brake shoes and also abutting said backing plate to transfer torque thereto during a service brake application, said support assembly further including a lever responsive to actuation of said parking assembly and cooperating with said pair of blocks to further expand the latter when said parking assembly is actuated, said pair of blocks moving away from the abutment with said backing plate to form a clearance therebetween which permits said pair of blocks and said pair of brake shoes to move slightly with the drum relative to the backing plate when said parking assembly is actuated.

2. A drum brake assembly of the type comprising a pair of arcuate brake shoes movably carried upon a backing plate, said pair of brake shoes defining pairs of confronting brake shoe ends, a hydraulic actuator received between one pair of said confronting brake shoe ends to move said brake shoes into engagement with a rotatable brake drum to effect a service brake application, a strut extending between said brake shoes adjacent to said hydraulic actuator, and a parking arm pivotally engaging one of said brake shoes and said strut to move said pair of brake shoes into engagement with said brake drum to effect a parking brake application in response to pivotal movement of said parking arm, a support assembly secured to said backing plate received between the other pair of confronting brake shoe ends to transfer braking torque from said brake shoes to said backing plate, said support assembly including a lever cam received between said other pair of confronting brake shoe ends to move said other pair of confronting brake shoe ends apart in response to pivotal movement of said lever cam, and interconnecting means for pivoting said lever cam to move said other pair of brake shoe ends apart in response to pivotal movement of said parking arm effecting a parking brake application, the improvement wherein said interconnecting means includes a link secured at one end thereof to an input member movable in response to an operator input force to effect a parking brake application, said link at its opposite end being pivotally coupled by a connector to said lever cam, and said link pivotally coupled intermediate its ends to said parking arm whereby a first phase of movement of said input member pivots said parking arm via said link to effect a parking brake application with said lever cam providing a first reaction force to said link and remaining substantially stationary, a second phase of said input member movement pivoting said lever cam via said link with said parking arm providing a second reaction force to said link and remaining substantially stationary.

3. The invention of claim 2 wherein said support assembly includes a cage secured to said backing plate, a pair of blocks movably received within said cage and engaging respective one of said other pair of confronting brake shoe ends, abutment means for transferring braking torque from said blocks to said backing plate while allowing circumferential movement thereof, said cam lever being interposed between said pair of blocks and defining cam surfaces engaging said blocks to move the latter circumferentially apart in response to pivoting of said cam lever.

4. The invention of claim 3 wherein said abutment means includes an elongate opening defined by each of said pair of blocks, a tubular spacer received in each of said openings, and a pair of pins extending through said spacers and engaging said backing plate and said cage to secure said cage and said spacers to said backing plate.

5. The invention of claim 2 wherein said drum brake assembly includes a resilient member yieldably biasing said other pair of confronting brake shoe ends toward said lever cam, said resilient member providing said first reaction force to said link via said lever cam during said first phase of a parking brake application.

* * * * *